(12) United States Patent
Bergmiller et al.

(10) Patent No.: US 7,537,277 B2
(45) Date of Patent: May 26, 2009

(54) VEHICLE ROOF

(75) Inventors: Alexander Bergmiller, Koenigsbrunn (DE); Martin Kiedl, Munich (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 11/814,298

(22) PCT Filed: Jan. 16, 2006

(86) PCT No.: PCT/DE2006/000049

§ 371 (c)(1),
(2), (4) Date: Jul. 19, 2007

(87) PCT Pub. No.: WO2006/076886

PCT Pub. Date: Jul. 27, 2006

(65) Prior Publication Data

US 2008/0106125 A1    May 8, 2008

(30) Foreign Application Priority Data

Jan. 19, 2005    (DE)    ........................ 10 2005 002 538

(51) Int. Cl.
*B60J 7/22*    (2006.01)
(52) U.S. Cl. .................................................... 296/217
(58) Field of Classification Search .................. 296/217
See application file for complete search history.

(56) References Cited

U.S. PATENT DOCUMENTS

| | | | | |
|---|---|---|---|---|
| 4,671,564 A | * | 6/1987 | Sumida et al. | 296/214 |
| 4,738,483 A | * | 4/1988 | Boots | 296/217 |
| 6,135,544 A | | 10/2000 | Kohlpaintner et al. | |
| 6,626,486 B2 | * | 9/2003 | Lane | 296/217 |
| 6,644,729 B2 | | 11/2003 | Sakai et al. | |
| 6,817,659 B2 | * | 11/2004 | Vogel et al. | 296/217 |
| 7,025,413 B2 | * | 4/2006 | Czechtizky | 296/217 |

FOREIGN PATENT DOCUMENTS

| | | |
|---|---|---|
| DE | 39 13 567 A1 | 10/1990 |
| DE | 197 01 479 A1 | 7/1998 |
| DE | 198 09 943 A1 | 9/1999 |
| DE | 101 42 047 A1 | 3/2003 |
| DE | 102 21 501 A1 | 11/2003 |
| DE | 102 31 169 A1 | 1/2004 |
| DE | 102 32 917 A1 | 2/2004 |
| EP | 2031449 * | 2/2000 |
| EP | 1 245 420 A1 | 10/2002 |
| JP | 61-169319 A | 7/1986 |

* cited by examiner

*Primary Examiner*—Dennis H Pedder
(74) *Attorney, Agent, or Firm*—David S. Safran; Roberts Mlotkowski; Safran & Cole, P.C.

(57) ABSTRACT

A vehicle roof with a roof opening system which has a roof frame surrounding an openable and closable roof opening, a wind deflector at a front edge region of the roof opening which can be pivoted out of a lowered position in a raising direction, and a positioning device which has a flexible element which is attached at a first end to the wind deflector and after being deflected by a deflection element is dynamically connected to a drive member which acts in the lengthwise direction of the vehicle so that the second end of the flexible element undergoes an offset parallel to the lengthwise axis of the vehicle when the drive member is actuated. When the flexible element is actuated, a retaining force directed at a right angle to the plane of the roof opening acts on the wind deflector to affect its positioning.

18 Claims, 4 Drawing Sheets

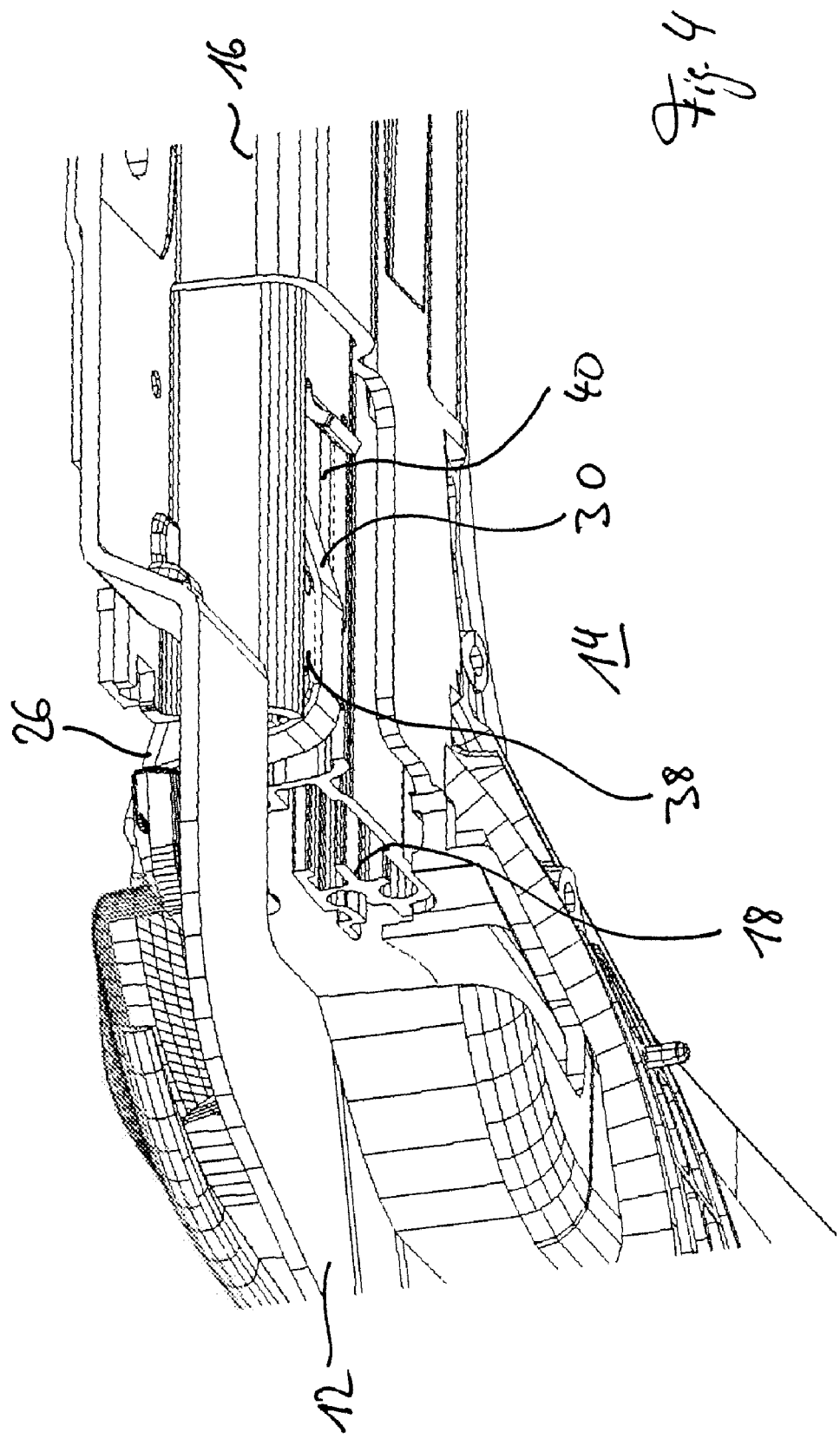

VEHICLE ROOF

BACKGROUND OF THE INVENTION

1. Field of the Invention

The invention relates to a vehicle roof with a roof opening system which has a roof frame, which has at least one cover element for selectively closing or at least partially clearing the roof opening, a wind deflector which is located in the front edge region of the roof opening and which can be pivoted out of a lowered position and is pretensioned in the raising direction with a raising angle that can be changed by at least one positioning means which has a flexible element which is attached at a first end to the wind deflector and which is deflected on a deflection element such that a retaining force directed at a right angle to the plane of the cover element acts on the wind deflector.

2. Description of Related Art

In a roof opening system, such as sliding roofs or lifting and sliding roofs which have a cover element for selective opening or closing of a roof opening of a motor vehicle, it is conventional to provide a wind deflector in the region of the front edge of the roof opening which projects above the contour of the roof skin after opening of the cover and influences the wind flow so that wind noise can be reduced. Furthermore, designing the wind deflector for further optimization of the wind noise such that its raising pivoting angle can be selected to be variable is known. For example, the raising angle can be changed depending on the vehicle speed.

A vehicle roof of the initially named type is known from German Patent Application DE 102 31 169 A1 that comprises a roof opening system which is provided with a cover element for selectively closing or at least partially clearing a roof opening. In the front edge region of the roof opening, the roof opening system comprises a wind deflector which has a wind deflector leaf and two side wind deflector arms. The two wind deflector arms are pretensioned in the raising direction so that, when the cover element is retracted, automatic raising of the wind deflector leaf takes place. In order to be able to keep the degree of raising of the wind deflector variable, there is a positioning means which comprises a carriage element which can be moved in the transverse direction of the motor vehicle and which acts via a coupling rod and a pressure element in the transverse direction of the motor vehicle on a strip-like, flexible element which is tied at one end to the wind deflector and at the other end is vehicle-mounted. The carriage moves a deflection element for the flexible element in the transverse direction of the vehicle, by which the flexible element acts on the wind deflector to limit the pivoting angle of the wind deflector. The mechanism for actuating the flexible element which is used as a hold-down consumes a large amount of installation space and is provided with a complicated mechanism.

Furthermore, for variable height adjustment of a wind deflector which is provided for a roof opening system, separate drives are known which have, for example, a stepping motor and mechanical rockers with movable stops or also a motor, a slotted link mechanism and flexible belts as the connection between the mechanism and the wind deflector leaf. All these setting means are complex and associated with a major installation effort.

SUMMARY OF THE INVENTION

The object of the invention is to devise a vehicle roof of the initially named type which is provided with a positioning means for the wind deflector which can be easily integrated into the roof frame of a roof opening system.

This object is achieved in accordance with the invention by the vehicle roof by having the end of the flexible element opposite that connected to the wind deflector (second end) dynamically connected to a driving means which acts in the lengthwise direction of the vehicle so that the second end of the flexible element undergoes an offset parallel to the lengthwise axis of the vehicle when the driving means is actuated.

Therefore, the heart of the invention involves designing a driving means such that the second end of the flexible element is exposed to a traction force or can be unloaded and this force is directed parallel to the lengthwise axis of the motor vehicle. A driving means designed in this way can be easily integrated, for example, into a guide rail of a conventional roof opening system. The flexible element also requires very little installation space so that it can also be integrated advantageously in the region of the guide rail. The guide rail is formed especially by the side part of the roof frame of the roof opening system. The deflection element is made vehicle-mounted. The flexible elements in the immediate vicinity to the wind deflector arms or raising springs of the wind deflector can act on it; this results in little deformation of the wind deflector. As a result of their action, the flexible elements are used as hold-downs and also the vertical stop for the wind deflector so that no additional components are necessary for these purposes.

Preferably, on either side of a wind deflector leaf, there is a positioning means made in accordance with the invention with a flexible element. Fundamentally, the flexible element can be used both in the dry and also wet regions of the roof opening system since the components used for this purpose are invulnerable to moisture.

The flexible element is formed, for example, from a strip, such as a fabric strip, a cable, a wire or the like.

In order to achieve exact guidance of the second end of the flexible element, it is preferably attached to a sliding element which is guided in a guideway. The connection of the flexible element to the sliding element which is made, for example, as a carriage, can be made either permanent or detachable.

The raising height of the wind deflector can be changed by moving the sliding element. The horizontal motion of the sliding element is deflected into a pivoting motion of the wind deflector by means of the flexible element.

In one economical embodiment, the guideway for the sliding element is made as a slide channel in the side frame part of the roof frame. Thus, no further components need be attached to the roof frame for guiding the sliding element.

The driving means for the flexible element is preferably formed by the exit end of a drive cable of a sliding headliner or of the cover element. The exit end of the drive cable constitutes the region of the drive cable which is located at a distance to the region of the drive cable which is connected to the component which is to be driven. In this case, there need not be a separate drive for the flexible element. Rather, the components of the roof opening system which are present anyway are used to drive the positioning means. Alternatively, the sliding headliner itself can also be used as the driving means for the flexible element. Then, only one dynamic mechanical connection between the sliding headliner and the flexible element need be formed, so that forces can be transmitted from the sliding headliner to the wind deflector.

However, it is also possible for the positioning means to be provided with a separate drive, such as a linear motor or a motor which is provided with a spindle. In this case, the raised height of the wind deflector can be changed independently of the actuation of the sliding headliner or of the cover element.

When the driving means is formed by the exit end of the drive cable, it is advantageous to guide it in a channel which the sliding element also engages. The exit end of the drive cable then acts on the region of the sliding element which engages the channel.

In one preferred embodiment of the vehicle roof in accordance with the invention, there is a stop spring which acts on the sliding element and which counteracts the opening spring for the wind deflector. The stop spring is necessary for ensuring the function of the positioning means or of the flexible element and of the wind deflector when the exit end of the drive cable or also the sliding headliner are used as driving means for the positioning means. That is, to ensure operation, there should not be a fixed connection between the drive cable or sliding headliner, on the one hand, and the sliding element, on the other.

The stop spring is used as a forward path limit for the sliding element. The stop spring can be integrated into the carriage support. However, the stop spring can also be supported directly in a channel of the side frame part, for example, in a channel for the exit end of the drive cable. Depending on the installation space situation, the stop spring can be made as a traction or pressing element. It can be formed by a helical spring or the like.

When the driving means is formed by the exit end of the drive cable, the sliding element is pushed forward by means of the exit end against the force of the stop spring so that the wind deflector is further raised. The force for raising the wind deflector is applied by a conventional raising spring for the wind deflector. Then, if the exit end of the drive cable is again pulled toward the rear, the sliding element is likewise pushed to the rear by the stop spring and the wind deflector is pivoted again to the bottom via the flexible element. The force of the stop spring is greater than the force of the raising spring.

In one special embodiment of the vehicle roof in accordance with the invention, the sliding element is guided in a guide unit which is connected to the side frame part. This guide unit can be easily placed on a conventional side frame part and attached to it.

The guide unit for the sliding element can also have a slide channel for the exit end of the drive cable of the roof opening system. The guide unit can also hold the stop spring which is then supported on the support which is formed by the guide unit.

Furthermore, the deflection element for the flexible element can also be made by the guide unit which has been put in place.

However, advantageously, the deflection element is a cross member of the roof frame. The cross member is preferably formed by an undercut of the roof frame. The undercut can be easily formed, for example, by punching.

Alternatively however, an additional component of plastic, a zinc diecasting or the like can be placed in the roof frame as a deflection element. In particular, the deflection element can be integrated either into the side part or the front part of the roof frame.

The deflection element should always be designed such that as few friction forces as possible act on the flexible element and ensure defined guidance of the flexible element on the deflection element. For example, the deflection element has a sliding zone with a width which corresponds to that of the flexible element.

In order to enable simple dismounting of the wind deflector, it is advantageous if the flexible element is detachably fastened to the wind deflector. This can take place, for example, by means of a so-called keyhole system.

The driving means for the flexible element can be actuated automatically, for example, depending on the driving speed and/or on the degree of opening of the cover element. Alternatively, triggering of the drive element for the flexible element can also be actuated manually.

Other advantages and advantageous embodiments of the subject matter of the invention will become apparent from the following detailed description together with the accompanying drawings.

BRIEF DESCRIPTION OF THE DRAWINGS

FIG. 4 is a perspective bottom view of the corner region, the roof frame being cut away for reasons of illustration.

DETAILED DESCRIPTION OF THE INVENTION

Figure 1:
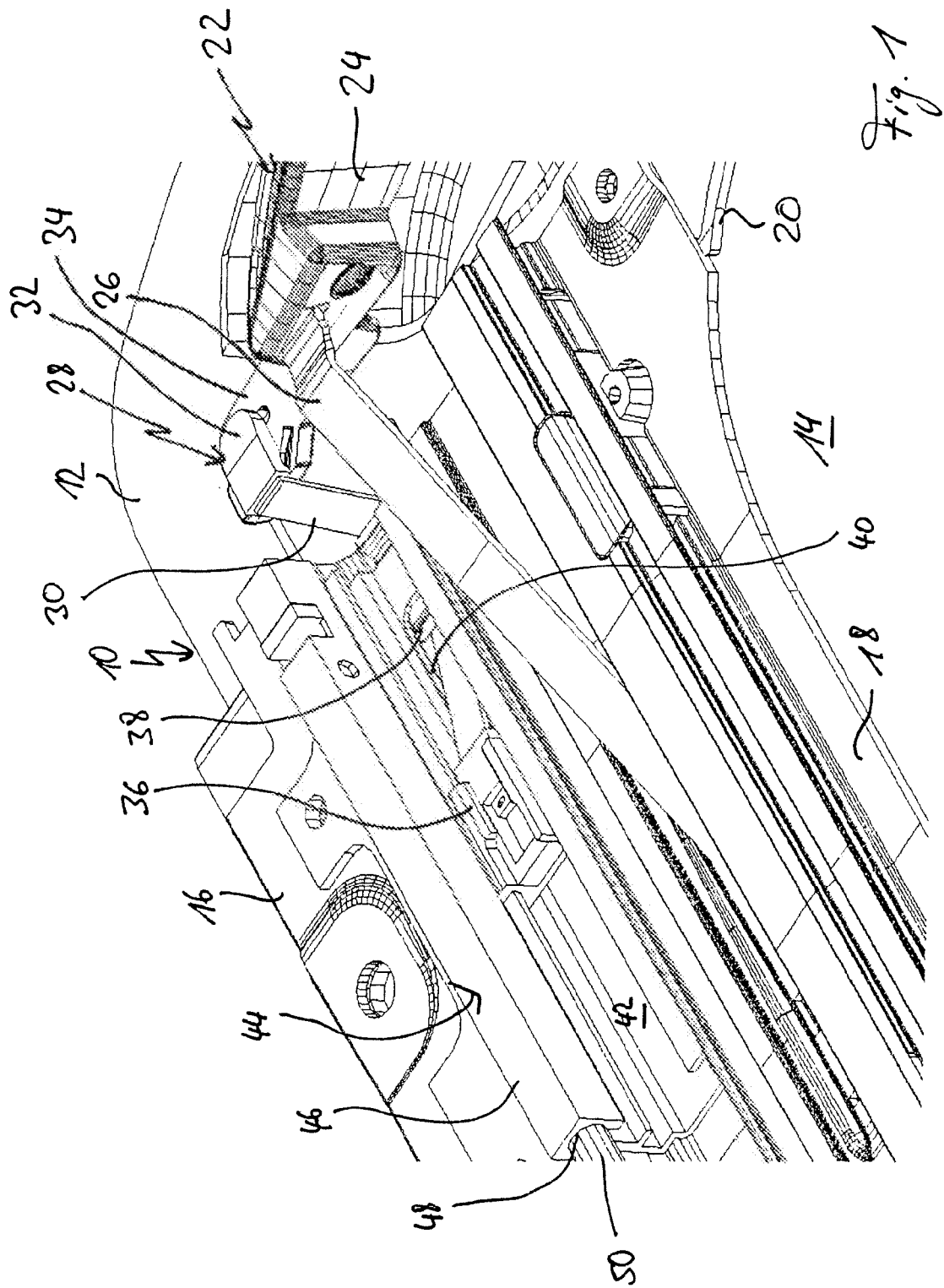
FIG. 1 is a perspective top view of the left front corner region of a roof frame of a roof opening system with a wind deflector in accordance with the invention.
Figure 2:
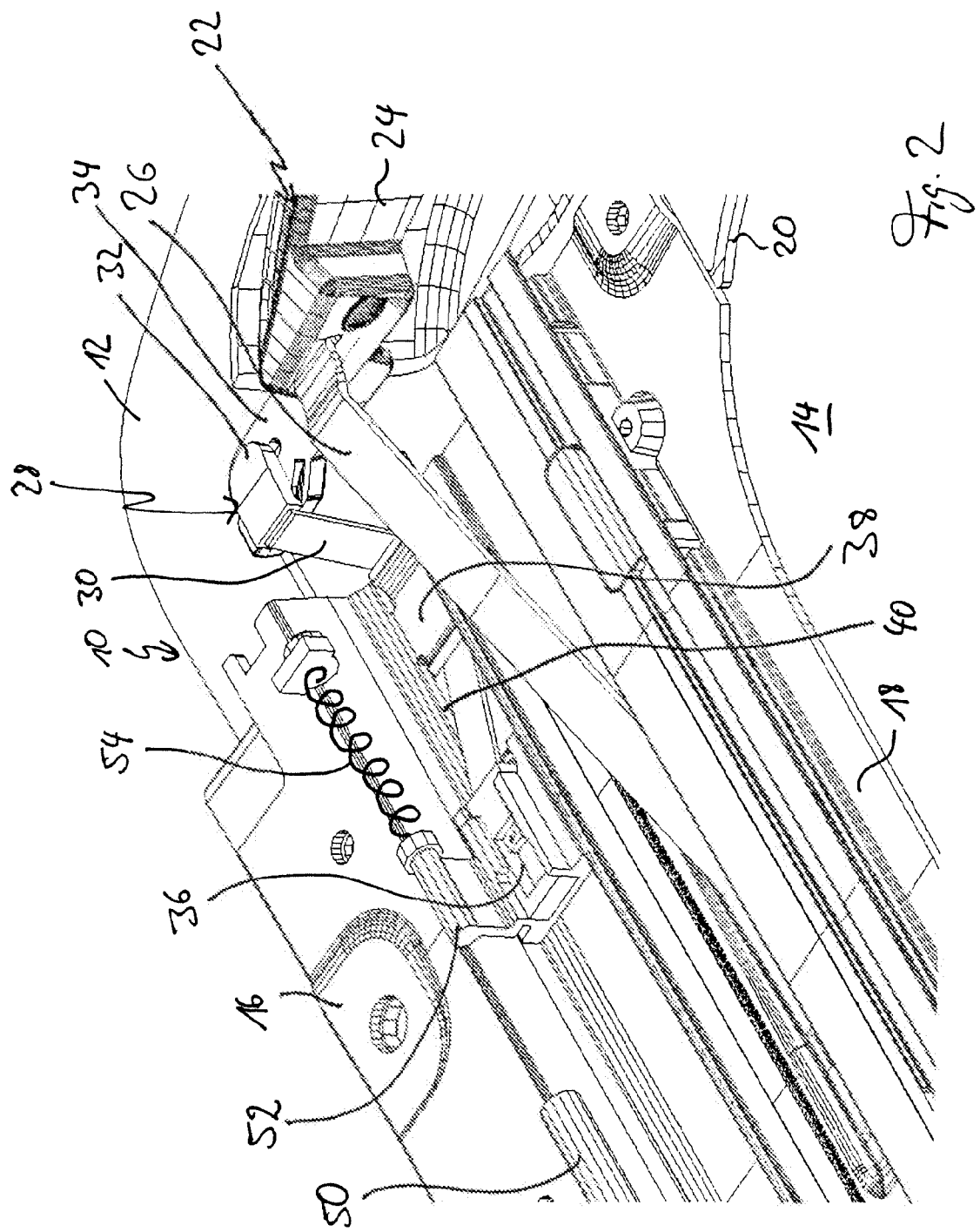
FIG. 2 is a view corresponding to FIG. 1, but without the guide unit for a carriage.
Figure 3:
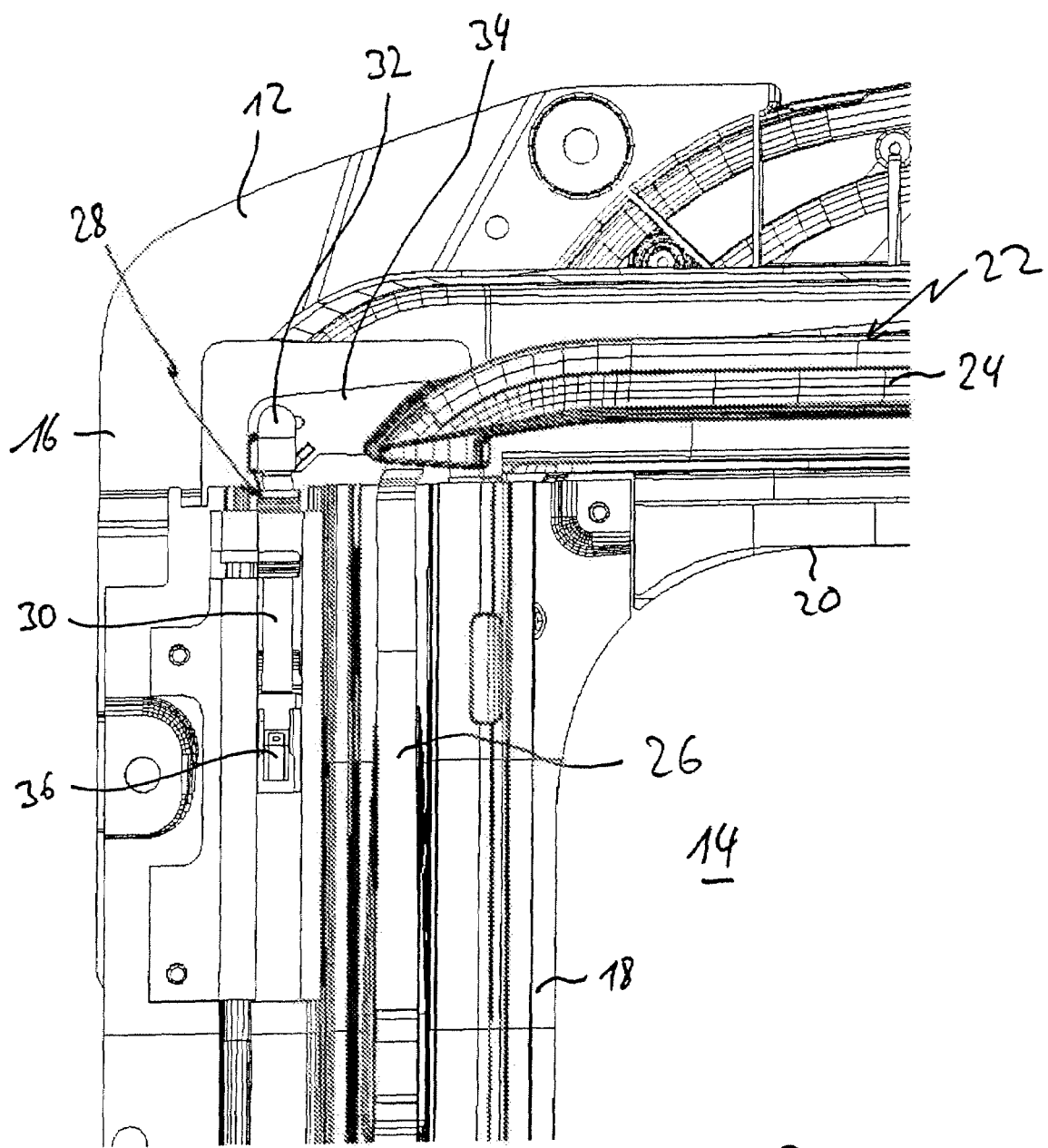
FIG. 3 is a top view of the corner region shown in FIG. 1.

The drawings show the left front corner region of the roof frame 10 of a sliding roof or sliding and lifting roof integrated into the vehicle roof of a passenger car. The roof frame 10 comprises a so-called front frame part 12 and two side frame parts 16, of which only the side frame part which is at left in the direction of driving is shown in the drawings. The side frame parts 16 are provided on each side of a roof opening 14 which is made in the fixed roof skin. The right side frame part is made essentially mirror-symmetrically to the illustrated left side frame part 16.

The terms "front", "back", "at left" and "at right" used here relate to the conventional forward direction of driving of the motor vehicle.

Furthermore, the roof opening system comprises a transparent cover element (not shown) and which is made in the conventional manner for selectively closing or at least partially clearing the roof opening 14. To position the cover element, in the region of the front frame part 12, there is a drive motor which is connected via compressively stiff drive cables to drive carriages which are movably guided on each side of the roof opening 14 in the guide rails 18 of the side frame parts 16 and are dynamically connected to the cover element. The sliding direction of the cover element corresponds to the lengthwise direction of a vehicle which is equipped with the vehicle roof made in accordance with the invention.

In the front edge region 20 of the roof opening 14, the roof opening system is equipped with a wind deflector 22 which comprises a wind deflector leaf 24 which is aligned essentially in the transverse direction of the vehicle and a wind deflector arm 26 on each side which is made, at the same time, as a raising spring so that the wind deflector 22 is elastically pretensioned in the raising direction. When the cover element is closed, it travels from the back against the wind deflector arms 26 so that the wind deflector 22 is lowered against the force of the wind deflector arms 26 which are made as raising springs. In this way, in the closed position of the cover element the wind deflector 22 is held in its rest position underneath the cover element against the pretensioning of the spring.

When the cover element is opened, conversely, the wind deflector arms 26 are released so that the wind deflector 22 can pivot up as a result of the spring force applied by the wind deflector arms 26. The raising motion of the wind deflector 22 is limited by a positioning means 28 which is located on each side of the wind deflector leaf 24, as explained below, and which therefore constitutes a raising limit.

The positioning means 28 comprises a fabric strip 30 which is detachably connected at its front end to the wind deflector leaf 24 via a so-called keyhole system 32 which interacts with a bearing plate 34 and its back end is detachable fixed on a carriage 36. The carriage 36 is guided to be able to move lengthwise in the guideway 42 of a guide unit 44 which is placed on the side frame part 10 in this embodiment. Alternatively, the carriage 36 could also be guided directly in the guide rail 18 in a guideway which is suitable for this purpose.

In its region which lies between the carriage 36 and the keyhole system 32, the fabric strip 30 is deflected by a cross member 38 which forms a deflection element so that the offset of the carriage 36 which takes place in the lengthwise direction of the vehicle is converted into essentially vertically directed motion of the front end of the fabric strip 30 and the wind deflector 22 thus undergoes a pivoting motion. The cross member 38 is formed by a punched out part 40 of the side frame part 10.

Additionally, the guide unit 44 comprises a slide channel formed by the housing 46 for the exit end 50 of a drive cable which is connected to the electric motor used in a conventional manner to drive a sliding headliner (not shown) and which is likewise guided on the guide rail 18. The exit end 50 of the drive cable constitutes that region of the drive cable which is located at a distance from the region of the drive cable connected to the sliding head liner.

The driver 52 of the carriage 36 is guided in the slide channel 48 and with the sliding headliner completely retracted adjoins the exit end 50 of the drive cable at its rear end. A stop spring 54, which is made as a helical spring, acts on the side of the driver 52 which faces away from the exit end 50 of the drive cable and is supported with its end facing away from the driver 52 on a support 56. The stop spring 54 has a spring force which is greater than the spring force acting the wind deflector 22 by the raising spring formed by the wind deflector arm 26.

The positioning means 28 for the wind deflector 22 works as follows.

When there is no contact between the exit end 50 of the drive cable which is used as the driving means for the fabric strip 30 and the driver 52 of the carriage 36, the stop spring 54 presses the carriage 36 to the rear so that a traction force acting in the vertical direction is applied via the fabric strip 30 to the wind deflector 22 and pulls it down, i.e., keeps it in the rest position. If, at this point, the exit end 50 of the drive cable presses against the driver 52 of the carriage 36 and moves the carriage 36 forward against the spring force of the stop spring 54, the fabric strip 30 is relieved and the wind deflector 22 is raised further by the action of the wind deflector arms 26 which act a raising springs. Depending on the position of the exit end 50 of the drive cable, the degree of raising of the wind deflector 22 can thus be varied. The exit end 50 of the drive cable is used, in this connection, as the driving means for the fabric strip 30 which constitutes a flexible element. If the exit end 50 of the drive cable is then pulled to the rear again, the carriage 36 is likewise shifted to the rear by the spring force of the stop spring 54, by which the wind deflector 22 is pivoted down again via the fabric strip 30.

What is claimed is:

1. Vehicle roof, with a roof opening system, comprising:
a roof frame bordering a roof opening in a fixed vehicle roof surface which is openable and closable by at least one cover element,
a wind deflector which is located in a front edge region of the roof opening and which is pivotable out of a lowered position and is pretensioned toward a raised position, and
at least one positioning means for changing the extent to which the wind deflector can be pivoted upward,
wherein at least one positioning means comprises a flexible element which is attached at a first end to the wind deflector and which, after being deflected by a deflection element, is dynamically connected to a driving means which acts in the lengthwise direction of the vehicle such that a retaining force directed at a right angle to the plane of the roof opening acts on the wind deflector when the driving means is actuated; and
wherein the second end of the flexible element is attached to the driving means via a sliding element which is guided in a guideway.

2. Vehicle roof as claimed in claim 1, wherein the flexible element is one of a strip, a cable or a wire.

3. Vehicle roof as claimed in claim 1, wherein the guideway is on a side frame part of the roof frame.

4. Vehicle roof as claimed in claim 1, wherein the driving means comprises an exit end of a drive cable.

5. Vehicle roof as claimed in claim 4, wherein the exit end of the drive cable is guided in a channel.

6. Vehicle roof as claimed in claim 1, wherein the deflection element comprises a cross member of the roof frame.

7. Vehicle roof as claimed in claim 1, wherein the sliding element is guided in a guide unit which is connected to the side frame part.

8. Vehicle roof as claimed in claim 7, wherein the driving means comprises an exit end of a drive cable and wherein the guide unit comprises a slide channel for the exit end of the drive cable of the roof opening system.

9. Vehicle roof as claimed in claim 7, wherein the deflection element is formed by the guide unit.

10. Vehicle roof as claimed in claim 1, wherein the flexible element is detachably fastened to the wind deflector.

11. Vehicle roof as claimed in claim 2, wherein the guideway is on a side frame part of the roof frame.

12. Vehicle roof as claimed in claim 11, wherein the driving means comprises an exit end of a drive cable.

13. Vehicle roof as claimed in claim 12, wherein the exit end of the drive cable is guided in a channel.

14. Vehicle roof as claimed in claim 13, further comprising a stop spring which acts on the sliding element and which acts counter to a raising spring for the wind deflector.

15. Vehicle roof as claimed in claim 14, wherein the deflection element comprises a cross member formed by a punched out part of the roof frame.

16. Vehicle roof as claimed in claim 14, wherein the sliding element is guided in a guide unit which is connected to the side frame part.

17. Vehicle roof as claimed in claim 16, wherein the guide unit comprises a slide channel for the exit end of the drive cable of the roof opening system.

18. Vehicle roof as claimed in claim 1, further comprising a stop spring which acts on the sliding element and which acts counter to a raising spring for the wind deflector.

* * * * *